United States Patent Office.

JOSEPH FRY, OF NEW ORLEANS, LOUISIANA.

Letters Patent No. 93,075, dated July 27, 1869.

IMPROVED MANUFACTURE FROM BANANAS AND PLANTAINS.

The Schedule referred to in these Letters Patent and making part of the same.

*To all whom it may concern:*

Be it known that I, JOSEPH FRY, of New Orleans, in the parish of Orleans, and State of Louisiana, have invented a new and valuable Improvement in the Desiccating of Bananas and Plantains; and I do hereby declare that the following is a full, clear, and exact description of the same.

My invention relates to new articles of food and commerce; and

It consists, mainly, in the desiccation of bananas and plantains in such manner as to render them impervious to decay, without subtracting any essential palatability or nutrimental substance.

My process for desiccating the fruit above mentioned, consists mainly in subjecting it to a slow heat, without the addition of sugar or any other substance whatsoever. I place the bananas or plantains within the influence of heat, which is carefully kept at a point above that which produces fermentation, and below that which roasts or cooks. By this means the sugar of the fruit gradually becomes congealed or crystallized, and the water evaporated.

When thus prepared, the fruit may be transported to a great distance, and kept on sale.

I advise, however, that in case the desiccated fruit is to be kept for a great length of time in a moist atmosphere, it be placed in proper receptacles and sealed, as is done often with lard and other perishable articles of commerce. In this matter the manufacturer must be governed, to a great extent, by the character of the climate to which the prepared fruit is to be sent. If such climate be humid, I advise packing and sealing, but if it be arid no such precaution is necessary.

What I claim as my invention, and desire to secure by Letters Patent, is—

1. The process herein described for desiccating bananas and plantains, substantially as specified.
2. Desiccated bananas and plantains as a new article of food and commerce.

In testimony that I claim the above, I have hereunto subscribed my name, in the presence of two witnesses.

JOSEPH FRY.

Witnesses:
 W. B. RIPLEY,
 DANIEL P. MARCY.